US010321391B2

United States Patent
Russell et al.

(10) Patent No.: US 10,321,391 B2
(45) Date of Patent: Jun. 11, 2019

(54) METHODS AND APPARATUS FOR CONFIGURING NETWORK CONNECTIONS USING A MEMORY

(71) Applicant: BLACKBERRY LIMITED, Waterloo (CA)

(72) Inventors: Nicholas James Russell, Newbury (GB); Jean-Philippe Paul Cormier, London (GB); Adrian Buckley, Tracy, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/513,398

(22) PCT Filed: Sep. 23, 2015

(86) PCT No.: PCT/US2015/051657
§ 371 (c)(1),
(2) Date: Mar. 22, 2017

(87) PCT Pub. No.: WO2016/049142
PCT Pub. Date: Mar. 31, 2016

(65) Prior Publication Data
US 2017/0311241 A1 Oct. 26, 2017

Related U.S. Application Data

(60) Provisional application No. 62/054,868, filed on Sep. 24, 2014.

(51) Int. Cl.
H04W 8/08 (2009.01)
H04W 48/20 (2009.01)
(Continued)

(52) U.S. Cl.
CPC ......... *H04W 48/17* (2013.01); *H04L 61/3075* (2013.01); *H04W 8/082* (2013.01);
(Continued)

(58) Field of Classification Search
CPC ..... H04W 12/06; H04W 60/00; H04W 88/02; H04W 48/20; H04W 76/02; H04W 88/08;
(Continued)

(56) References Cited

U.S. PATENT DOCUMENTS

2004/0195313 A1* 10/2004 Lee .................. H04L 41/0843
235/380
2006/0116169 A1* 6/2006 Park .................. H04W 8/265
455/558
(Continued)

FOREIGN PATENT DOCUMENTS

| CN | 103813295 | 5/2014 |
| DE | 202008004170 | 7/2008 |
| WO | 2015133640 | 9/2015 |

OTHER PUBLICATIONS

3GPP TR 22.802 V0.2.1, 3rd Generation Partnership Project; Technical Specification Group SA; "Study of Need for Multiple APNs," (Release 13), Mobile Competence Centre, Feb. 27, 2014; 9 pages.
(Continued)

Primary Examiner — Kwasi Karikari
(74) Attorney, Agent, or Firm — Fish & Richardson P.C.

(57) ABSTRACT

Methods and apparatus for configuring network connections using memory are described. An example method for use in mobile equipment includes: reading a mobile subscriber identity from a memory device associated with the mobile equipment; determining if part or all of the mobile subscriber identity matches a data set entry within a file associated with the mobile equipment; determining if an elementary file is on the memory device; when the elementary file
(Continued)

is on the memory device, determining if an access point name is stored in a location identified in the elementary file; and when the access point name is stored in the location identified in the elementary file, using the access point name to connect the mobile equipment to a mobile network. Other examples are disclosed.

15 Claims, 6 Drawing Sheets

(51) Int. Cl.
  *H04W 48/00* (2009.01)
  *H04W 88/02* (2009.01)
  *H04L 29/12* (2006.01)
(52) U.S. Cl.
  CPC ......... *H04W 48/20* (2013.01); *H04L 61/6054* (2013.01); *H04W 88/02* (2013.01)
(58) Field of Classification Search
  CPC ............ H04L 63/0853; H04M 15/715; H04M 17/103; H04M 15/751; H04M 15/7556
  See application file for complete search history.

(56) References Cited

U.S. PATENT DOCUMENTS

| | | |
|---|---|---|
| 2010/0197350 A1 | 8/2010 | Jeung |
| 2010/0330968 A1 | 12/2010 | Pecen |
| 2011/0319133 A1 | 12/2011 | Dong |
| 2012/0077496 A1* | 3/2012 | Mathias ................ G06Q 30/06 455/435.1 |
| 2012/0113865 A1 | 5/2012 | Zhao et al. |
| 2013/0102356 A1* | 4/2013 | Shaw .................... H04W 48/17 455/525 |
| 2015/0105058 A1* | 4/2015 | Chuang ................ H04W 8/183 455/418 |

OTHER PUBLICATIONS

3GPP S1-135042, "Discussion: What is the benefit of the FS MAPN work study item?" 3GPP Draft; S1-135042 MAPN Discussion Paper, 3rd Generation Partnership Project; Mobile Competence Centre, Nov. 15, 2013; 6 pages.
International Search Report and Written Opinion of the International Searching Authority issued in International Application No. PCT/US2015/051657 dated Jan. 13, 2016; 9 pages.
3GPP TR 22.802, 3rd Generation Partnership Project; Technical Specification Group SA, "Study of Need for Multiple APNs," (Release 13), Mobile Competence Centre, Aug. 25, 2014, 14 pages.
Ilario Macchi-Giesecke and Devrient, "APN & USIM—discussion paper," 3rd Generation Partnership Project (3GPP Draft), vol. SA WG1, Aug. 16, 2010, 13 pages.
European Search Report and Written Opinion in European Application No. 15844192.3, dated Feb. 21, 2018, 14 pages.

* cited by examiner

METHODS AND APPARATUS FOR CONFIGURING NETWORK CONNECTIONS USING A MEMORY

CROSS-REFERENCE TO RELATED APPLICATIONS

This application is a U.S. National Stage of PCT/US2015/051657 filed on Sep. 23, 2015, which claims the benefit of U.S. Provisional Application No. 62/054,868, filed Sep. 24, 2014, the contents of which are hereby incorporated in their entirety.

FIELD OF THE DISCLOSURE

This disclosure relates generally to mobile communications and, more particularly, to methods and apparatus for configuring network connections using a memory.

BACKGROUND

Mobile devices, also referred to herein as Mobile Equipment (ME) can connect to many different networks. An Access Point Name (APN) is used to allow a mobile device to select and connect with a data network. The APN identifies a point of presence to which the mobile device wants to connect. Devices traditionally connect to services such as: Internet, Wireless Application Protocol (WAP), Multimedia Messaging Service (MMS), IP Multimedia Subsystem (IMS), etc. Each service usually has its own APN, however different services may also use the same APN.

An APN is an alphanumeric string that may be in the form of a Fully Qualified Domain Name (FQDN). APNs are usually stored in the mobile device and are usually provisioned by the mobile device manufacturer. Network operators are free to choose their own APN settings for a service. For example, Operator A may use APN=Internet.OperatorA for Internet service, while Operator B might use APN=dataconnect.OperatorB for Internet service. A user might also be allowed to enter an APN manually via a graphical user interface (GUI) or other man-machine interface (MMI). The point of presence the APN terminates on is a network node, such as, for example, a Gateway GPRS Support Node (GGSN) or a Packet Data Network Gateway (PGW). The point of presence is most commonly in the Home Public Land Mobile Network (HPLMN), but the point of presence could be in the Visited Public Land Mobile Network (VPLMN), if roaming.

Mobile devices can utilize a Subscriber Identity Module (SIM), Universal Subscriber Identity Module (USIM) and/or IP Multimedia Services Identity Module (ISIM) application standardized/specified in 3GPP TS 31.103 on an embedded or insertable/removable Universal Integrated Circuit Card (UICC). A UICC and a Mobile Equipment (ME) compose an instance of a User Equipment (UE).

A UICC hosts one or more applications. An example of an application found in the mobile environment is the USIM application specified in 3GPP TS 31.102. In the USIM application, there is a file or data structure defined called the APN Control List (ACL). This ACL in the USIM is standardized/specified in 3GPP TS 31.102. The ACL is used by an operator to restrict the APNs that a UE can use to set up a data connection. If the ACL is present, the ME checks to see if an APN is listed in the ACL. If the APN is found by the ME to be in the ACL, the ME can use that APN to request a data connection, otherwise in general the ME cannot.

There are also regulations in Europe that allow an ME, when roaming, to use an alternative provider than the HPLMN for Internet services. This means that the ME should be able to give the user of the device the option to enter or choose an alternative APN that allows a different provider to be used for Internet.

BRIEF DESCRIPTION OF THE DRAWINGS

FIG. 3 shows portions of the universal integrated circuit card (UICC) and the memory of the mobile equipment when there is correspondence there between.

FIG. 4 shows portions of the subscriber identity module card and the memory of the mobile equipment when there is no correspondence there between.

DETAILED DESCRIPTION

As described herein, different operators/carriers use their own, specific values for APNs of different Packet Switched (PS) data connections relating to one or more services. Examples of such services include Internet access, tethered data, WAP, MMS, Virtual Private Network (VPN), etc. UEs that can establish one or more PS data connections (known hereafter as just "UEs") need to be able to determine what APN value to use for the services that the device supports, and also to determine whether a new PS data connection is needed or an existing PS data connection should be used. In the absence of configuration on the ME that informs the ME of the APNs for a PLMN specified on the UICC, it is not possible for the device to determine what APN value to use for specific services/applications in the ME, due to different carriers using different values.

As described herein, when an ME determines that it does not have PS configuration information (e.g., APNs) for a particular HPLMN (e.g. as specified by an International mobile Subscriber Identity (IMSI) or part of an IMSI on a SIM or a USIM application residing on a UICC), the ME may obtain an APN to use from an application/memory location (e.g., SIM, USIM, ISIM) on the UICC. The APN may be obtained by performing: using a single list of APNs in a single file; using an index in one file that points to an APN within the same file; and using an index in one file that points to an APN within another file; and/or using a combination of the foregoing.

According to this approach, the ME obtains APNs needed for the PLMN to facilitate PS services for the ME. Accordingly, an ME vendor need not keep track of the exact APN(s) to configure for an operator. Additionally, issues are also alleviated related to APNs for Mobile Virtual Network Operator (MVNO) (e.g., an operator/carrier having a home network belonging to another carrier but issued under an IMSI of the MVNO).

In one example, the APN information stored in USIM Elementary Files (EFs) in line with the solutions described may be updated by means of SIM update over the air (SIM-OTA) techniques, allowing an operator to remotely update the appropriate APNs stored in UICCs.

Figure 1:
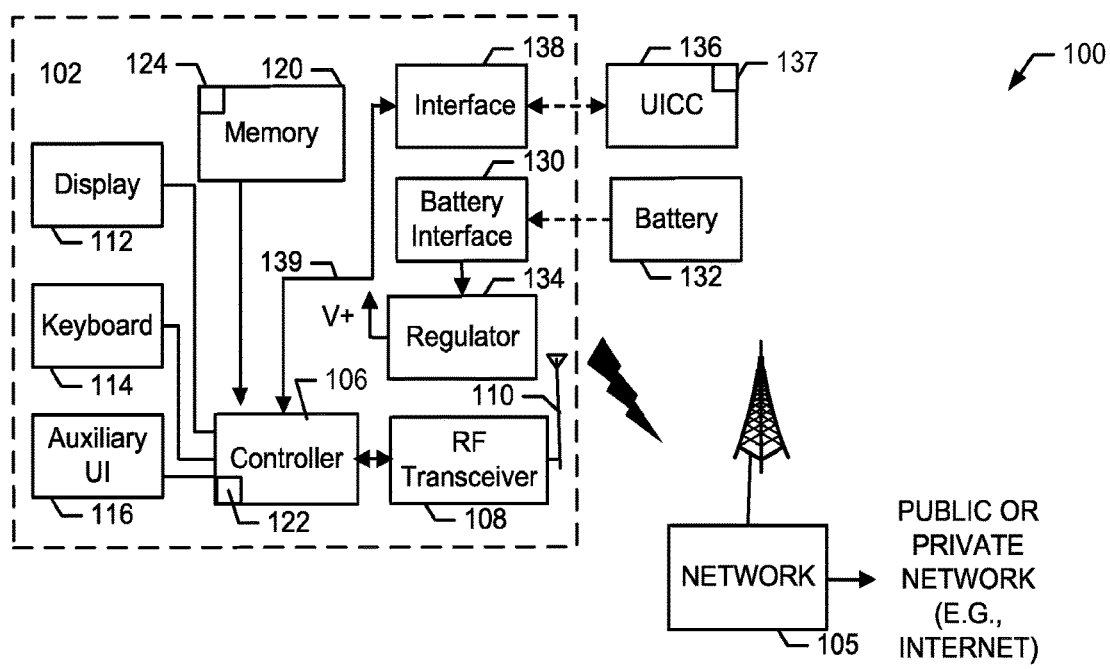
FIG. 1 shows a mobile equipment (ME) connecting to one of two public land mobile networks.
Figure 1:
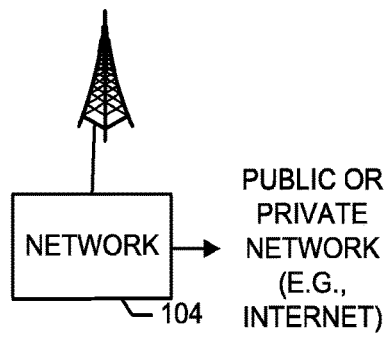

Turning to FIG. 1, a block diagram of an example communication system 100 implemented as described herein to facilitate establishment of PD connections even when the APNs for a particular PLMN are not know by the ME.

FIG. 1 is a block diagram of a communication system 100, which includes a mobile equipment (ME) 102 (one type of user equipment, wireless or mobile communication device) that communicates through a wireless communication network 104 and/or a wireless communication network 105. According to the illustrated example, the wireless communication network 104 implements a home network (home public land mobile network (HPLMN)) and the wireless communication network 105 implements a visited network (visited public land mobile network (VPLMN)) that is a separate network from the home network. In other words, when the ME 102 is outside the area covered by the wireless communication network 104, the ME 102 will connect to the wireless communication network 105.

In some examples, the wireless communication network 105 may be a network that is not previously known to the ME 102. Accordingly, the ME 102 may be unaware of the APNs needed to facilitate PD connections between the ME 102 and the wireless communication network 105. As described below, information provided on the memory card, such as a UICC, provided to the ME 102 may provide the needed APN information.

In the example of FIG. 1, the ME 102 includes a controller 106, one or more radio frequency (RF) transceivers 108 and one or more associated antennas 110, a man-machine interface (MMI) constituted by a visual display 112 and a keyboard 114, perhaps one or more auxiliary user interfaces (UI) 116, and one or more memories 120 all of which are coupled to the controller 106 and may be capable of communicating over multiple access technologies. In one example, the controller 106 is implemented using a central processing unit (CPU) that runs operating system software stored in a memory 120. The controller 106 will normally control overall operation of ME 102, whereas signal processing operations associated with communication functions are typically performed by circuitry of the RF transceiver 108. The controller 106 interfaces with the display 112 to present received information, stored information, user inputs, and the like.

The example controller 106 includes an APN manager 122 that manages how the ME 102 obtains and utilizes APN information for various networks (e.g., the networks 104 and 105). The APN manager 122 may access data files in memory 120 or on one or more external memories e.g., a UICC 136, to obtain APN information that is used to facilitate establishment of data connections. In one example, the memory 120 may maintain an APN data file 124, such as an XML data file that relates service providers to the APNs that are to be used to obtain data services from those service providers.

The keyboard 114, which may be a telephone type keypad or full alphanumeric keyboard or a virtual keyboard, is normally provided for entering data for storage in the ME 102, information for transmission to the network 104, a telephone number to place a telephone call, commands to be executed on the ME 102, and possibly other or different user inputs.

ME 102 sends communication signals to, and receives communication signals from the network 104 over a wireless link via the antenna 110. The RF transceiver circuitry 108 performs, for example, modulation/demodulation, encoding/decoding, and encryption/decryption. It will be apparent to those skilled in art that the one or more instances of RF transceiver 108 will be adapted to interoperate with any wireless network or networks in which ME 102 may operate.

The ME 102 further includes a battery interface 130 for receiving one or more rechargeable batteries 132. The battery 132 provides power to electrical circuitry in ME 102, and the battery interface 130 provides for a mechanical and electrical connection for the battery 132. The battery interface 130 is coupled to a regulator 134 that regulates power V+ to the device. When the ME 102 is operational, an RF transmitter of the RF transceiver circuitry 108 is typically keyed or turned on only when it is sending information to the network, and is otherwise turned off to conserve resources. Similarly, an RF receiver of the RF transceiver circuitry 108 is typically periodically turned off to conserve power until it is needed to receive signals or information (if at all) during designated time periods.

The ME 102 operates using the UICC 136 that is connected to or inserted in the ME 102 at an interface 138. While the UICC 136 is provided as one example, other forms of memory may be used. When the UICC 136 is combined with the ME 102, the combination may be referred to as user equipment (UE). The UICC 136 includes information to make the UICC 136 a subscriber identity module, which is one type of a removable memory module or "smart card" used to identify an end user of ME 102 (or subscriber) and to personalize the device, among other things. Without the UICC 136, the example ME 102 is not fully operational for communication through the wireless network 104. By inserting the UICC 136 into the ME 102, an end user can have access to any and all of his/her subscribed services.

The UICC 136 generally includes a processor and memory for storing information. Because the UICC 136 is coupled to the interface 138, it is coupled to the controller 106 through communication lines 139. To identify the subscriber, the UICC 136 contains some user parameters such as an International Mobile Subscriber Identity (IMSI). One feature of using the UICC 136 is that end users are not necessarily bound by any single physical mobile station because the UICC 136 may be used in any number of different mobile stations. The UICC 136 may store additional user information for the ME 102 as well but not limited to, including Personal Information Manager (PIM) data such as datebook (or calendar) and contact/phonebook information, recent call information, and network connection information. Additionally, the UICC 136 may store APN information 137 that is accessed by the APN manager 122 to obtain the APN information 137 that is used to facilitate PD connections when such information is not found in the APN data file 124 of the ME 102.

The ME 102 may be a single unit, such as a data communication device, a cellular telephone, a multiple-function communication device with data (e.g., electronic mail, internet access, personal information management, etc.) and voice communication capabilities, a personal digital assistant (PDA) enabled for wireless communication, or a computer incorporating an internal modem. Alternatively, the ME 102 may be a multiple-module unit comprising a plurality of separate components, including but in no way limited to a computer or other device connected to a wireless or wired modem. In particular, for example, in the mobile station block diagram of FIG. 1, the RF transceiver circuitry 108 and antenna 110 may be implemented as a radio modem unit that may be inserted into a port on a laptop computer or tablet computer. In this case, the laptop computer or tablet computer would include the display 112, keyboard 114, one or more auxiliary UIs 116, and the controller 106 may be the computer's CPU. Furthermore a computer or other equipment not normally capable of wireless communication may be adapted to connect to and effectively assume control of the RF transceiver circuitry 108 and the antenna 110 of a single-unit device such as one of those described above.

The ME 102 communicates in and through the wireless communication network 104 (e.g., a home network, HPLMN, for the ME 102), which may be a cellular telecommunications network. In the example of FIG. 1, the wireless network 104 is configured in accordance with a long term evolution (LTE) model. However, other models, such as but not limited to, a General Packet Radio Service (GPRS) and a Global Systems for Mobile (GSM) technologies etc. may also be used. The wireless network 104 may be configured according to any communication technology including, for example, universal mobile telecommunications system (UMTS), worldwide interoperability for microwave access (WiMAX), code division multiple access (CDMA), etc. While the following description references components of the wireless communication network 104, the wireless communication network 105 may include the same, similar, or different components to implement a second node of the wireless communication network 104 or a second wireless communication network.

In one example, the wireless network 104 is an HPLMN associated with the ME 104. Accordingly, the ME 104 stores APN information in the APN data file 124. In one example, the APN data file 124 may be stored in the ME 102 during manufacture of the ME 102. As will be readily appreciated, the APN data file 124 can only store information known to the manufacturer at the time the ME 102 is programmed at the factory. As such, APNs associated with new networks, new carriers, or different geographic areas will not be stored in the APN data file 124. The wireless network 105 may be a network operated by an MVNO and, as such may have a home network belonging to one carrier but issued under an IMSI of the MVNO. Thus, the IMSI of the MVNO may not have associated APNs stored within the APN data file 124. As described herein, the APN manager 122 may access APN information 137 from the UICC 136, so that the ME 102 will be aware of the APNs to use to establish PD connections for the ME 102.

Figure 2:
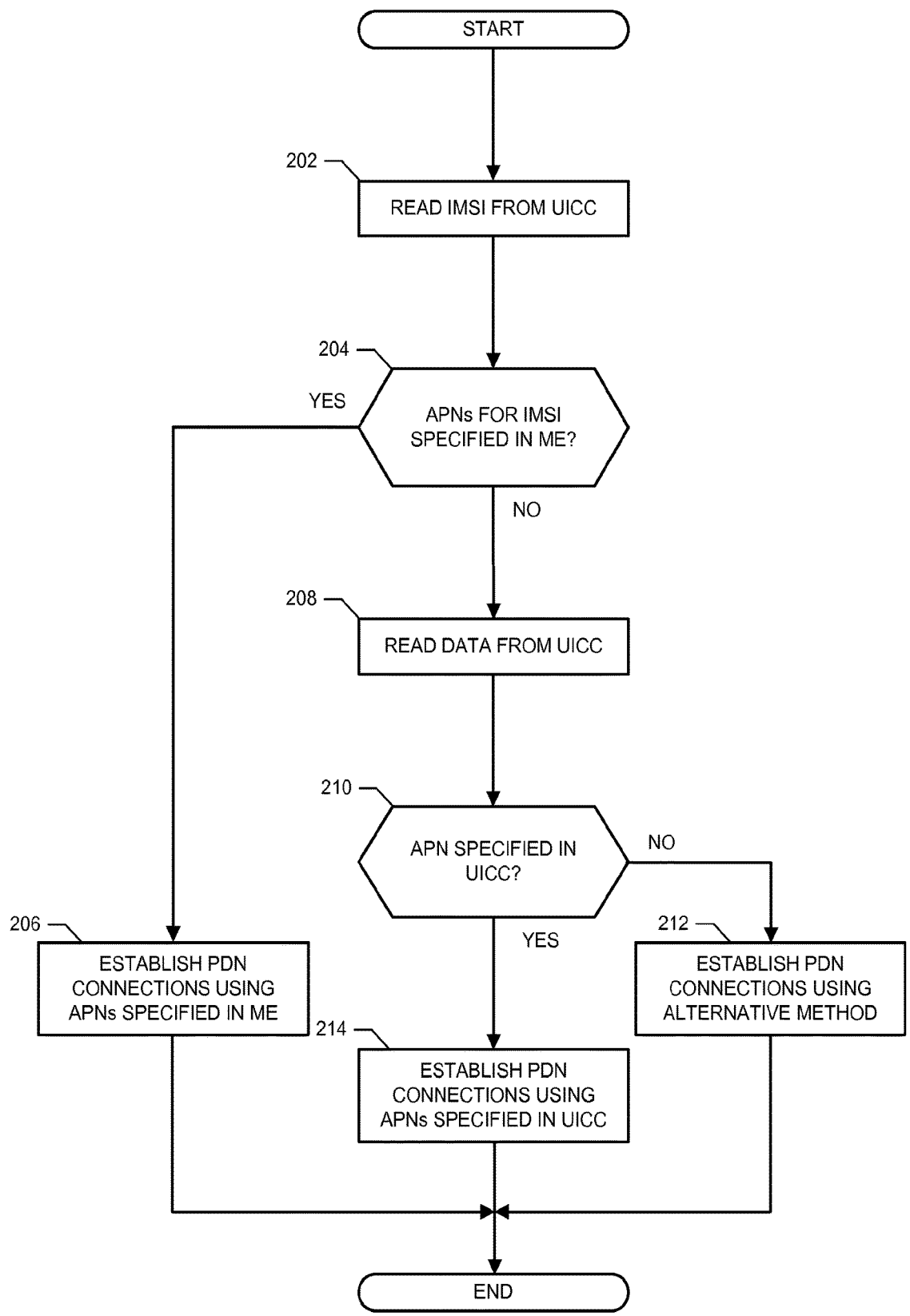
FIG. 2 is a flow diagram representative of a process for establishing a packet data connection, which may be implemented using machine-readable instructions on the ME.

A flowchart representative of an example process that may be executed by the ME 102 to obtain APN information is shown in FIG. 2. In the example of FIG. 2, the process represented by each flowchart may be implemented by one or more programs comprising machine readable instructions for execution by: (a) a processor, such as a microprocessor; (b) a controller, such as the controller 106 of FIG. 1; and/or (c) any other suitable device. The one or more programs may be embodied in executable instructions stored on a tangible medium such as, for example, the memory 120, a flash memory, a CD-ROM, a floppy disk, a hard drive, a DVD, or a memory associated with the controller 106, but the entire program or programs and/or portions thereof could alternatively be executed by a device other than the controller 106 and/or embodied in firmware or dedicated hardware (e.g., implemented by an application specific integrated circuit (ASIC), a programmable logic device (PLD), a field programmable logic device (FPLD) or field programmable gate array (FPGA), a state machine, discrete logic, etc.). For example, any one, some or all of the example mobile communications system components could be implemented by any combination of software, hardware, and/or firmware. Also, some or all of the example process represented by the flowchart of FIG. 2 may be implemented manually.

Further, although the example process is described with reference to the flowchart of FIG. 2, many other techniques for implementing the example methods and apparatus described herein may alternatively be used. For example, with reference to the flowchart illustrated in FIG. 2, the order of execution of the blocks may be changed, and/or some of the blocks described may be changed, eliminated, combined, and/or subdivided into multiple blocks.

FIG. 2 is a flowchart of an example process that may be implemented by a mobile device such as the ME 102 to obtain APN information when APN information is not native to the ME 102 (e.g., is not stored in the APN data file 124 of the memory 120). In one example, the process of FIG. 2 is carried out by the APN manager 122 of the ME 102 of FIG. 1. The process of FIG. 2 may begin when the ME 102 is powered-up, is reset, or when the UICC 136 is inserted into the ME 102. Alternatively, the process of FIG. 2 may begin under other circumstances. The ME 102 reads a subscriber identity e.g. IMSI, Network Access Identifier (NAI), SIP URI, Tel URI, FQDN, URI (see RFC 3986 which is incorporated by reference) etc., from the UICC 136 (block 202). The ME 102 performs a UICC HPLMN determination procedure by determining whether APNs for the subscriber identity or part of the subscriber identity are specified in the APN data file 124 of the ME 102 (block 204). Some examples of how this UICC HPLMN determination procedure are as follows. When the subscriber identity is an:

IMSI the ME determines part or all of Mobile Country Code (MCC) of an IMSI, part or all of the Mobile Network Code (MNC) of an IMSI, part or all of the Mobile Subscriber Identification Number (MSIN) of an IMSI, etc., are specified in the APN data file 124 of the ME 102 (block 204). Optionally, in addition or alternatively to the IMSI, other fields on the UICC may also be used e.g. Group Identifier Level 1 (GID1), Group Identifier Level 2 (GID2).

NAI the ME determines if part or all of domain part of the NAI; or part or all of the user info and or hostname/domain part of the NAI; are specified in the APN data file 124 of the ME 102 (block 204).

FQDN the ME determines if part or all of the FQN is specified in the APN data file 124 of the ME 102 (block 204).

URI the ME determines if part or all of domain part of the URI; or part or all of the user info and or hostname/domain part of the URI; are specified in the APN data file 124 of the ME 102 (block 204)

Those skilled in the art will appreciate that the examples below make specific reference to when the subscriber identity is an IMSI, however any of the above could equally be used.

Figure 3:
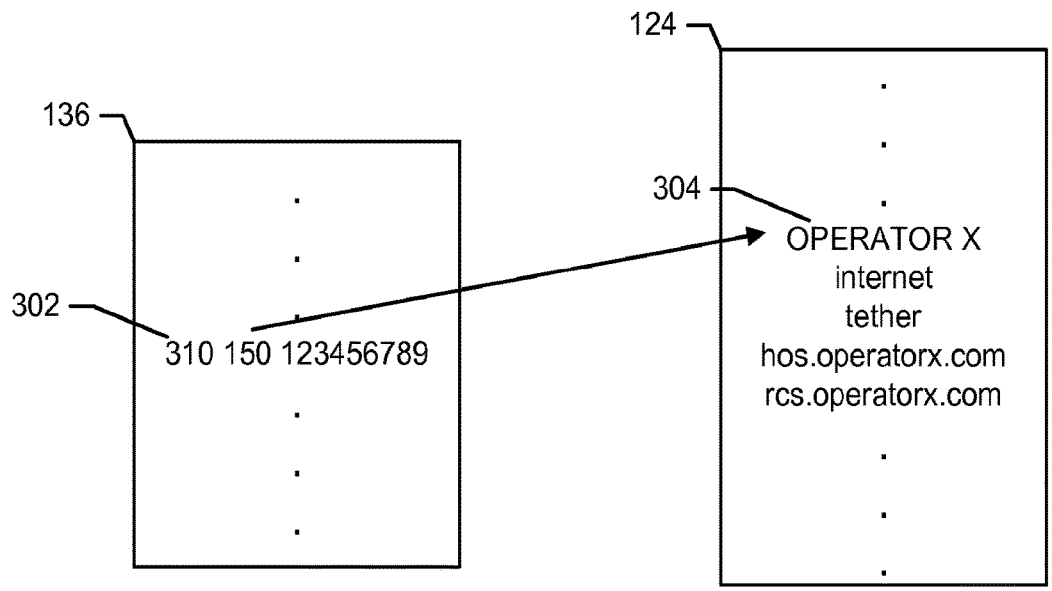

FIG. 3 represents an example when the ME 104 receives a UICC 136 having an IMSI 302 associated with network information 304 specified in the APN data file 124. For example, the IMSI 302 may specify a code "150" that the APN manager 122 determines is associated with the service provider Operator X and, accordingly, there is an association between the IMSI 302 and the network information 304. The network information 304 may include APNs for various data services. For example, as explained herein, a first entry in the network information 304 may be the APN for Internet data (which might also be referred to as the "default APN" in some deployments/implementations), the second may be the APN for tethered data, the third APN may be for home operator services (hos) data (which may include, but not limited to, e.g. the Multimedia Messaging Service (MMS), WAP, HPLMN remote device configuration, etc.), and the third APN may be for Rich Communications Services/Suite (RCS) data. The ordering of these services are just an example and the same services and/or different ones could be provided in any order i.e. the specific services and their ordering stated here are not pertinent to this invention.

When an APN for the IMSI is specified in APN data file 124 (as determined by the UICC HPLMN determination procedure) (block 204), the APN manager 122 facilitates establishment of a data connection using the APN(s) specified in the ME 102 (block 206). As noted herein, the APN(s) may be specified in the APN data file 124.

Figure 4:
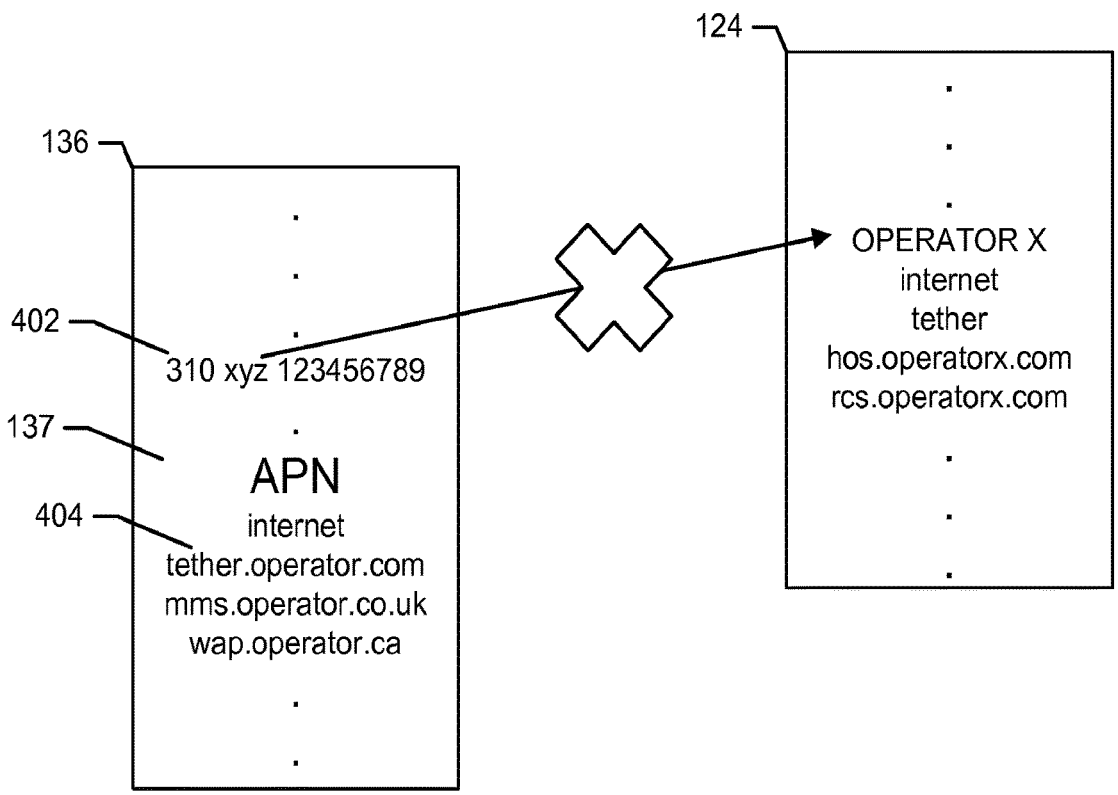

If, however, the APNs for the IMSI are not specified in the ME 102 (block 204), the APN manager 122 reads the APN information 137 from the UICC 136 (block 208), if not already done so as part of the ME initialization process with the UICC. For the purpose of this description it will be appreciated that the ME can either read the UICC data from the UICC or from the UICC data that is stored in memory. For the purpose of this description when one reads from UICC either could be applicable. For example, as shown in FIG. 4, if the ME 102 is connecting to the network 105, which may be an MVNO, the IMSI 402 may specify a PLMN (shown in the example of FIG. 4 using code xyz) that does not have associated information in the APN data file 124. In such a case, the APN manager 122 is unable to determine APNs based on information native to the ME 102 and will read the APN information 137 from the UICC 136 or from a local copy of the UICC data that may be stored in the ME memory.

If there is no APN information specified in the UICC 136 (block 210), the APN manager 122 concludes that no APN information is available and the ME 102 will establish PD connections using alternative methods (block 212). If, however, APN information is specified in the UICC 136 (block 210), the APN manager 122 facilitates establishment of one or more PD connections using the APNs specified in the APN information 137 of the UICC 136 (block 214). For example, as shown in FIG. 4, the APN information 137 of the UICC 136 may include APNs 404 that is associated with the provider of the UICC 136 (e.g., the MVNO associated with the network 105). The APN information 137 may include APNs 404 that the APN manager 122 of the ME 102 may use to establish data connections for e.g., Internet, tethering, MMS, and/or WAP.

Figure 5:
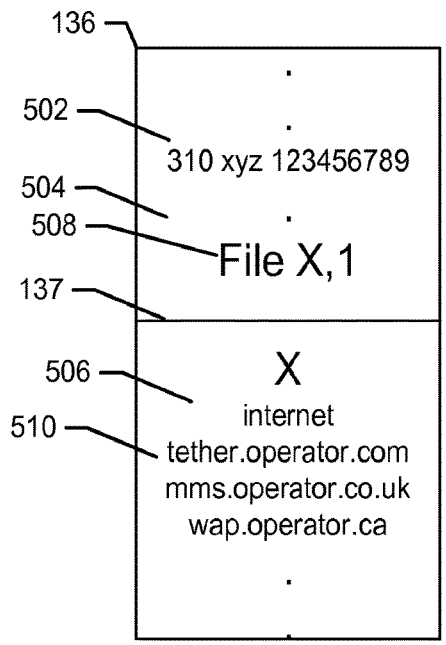
FIG. 5 shows an UICC including an enumeration of access point names (APNs).

While the IMSI 402 and the APNs 404 are shown as part of the UICC 136 in a single file in FIG. 4, as shown in FIG. 5, the IMSI 502 may reside in a first data structure in a first file 504 and the APN information 137 may reside in a second data structure in a second file 506. For example, the file 504 may identify the file name and line number 508 the APNs 510.

I. A Single List of APNs in a Single File

As described above, a single list of APNs may be stored in a single file. In this solution, the ME, e.g. for certain services (in particular, non-IMS services), chooses an APN to use from a UICC file (e.g., the $EF_{ACL}$ file on the UICC) that is detected by the ME to exist and which may already be populated with one or more APNs. This solution has a useful feature of not requiring any modification to the UICC (or the applications on it) and is likely to work on UICCs already in circulation.

Figure 6:
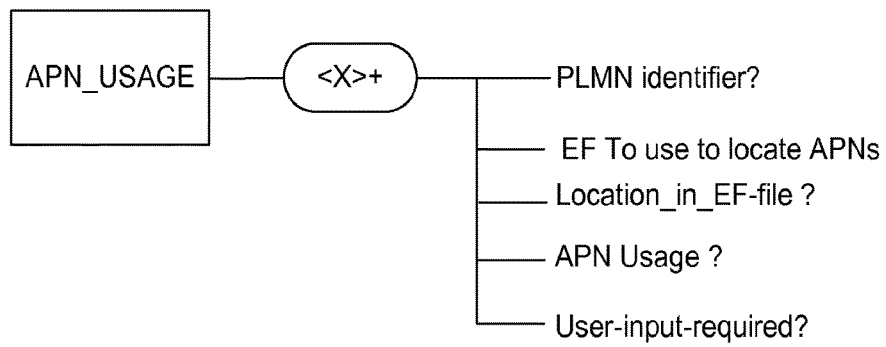
FIG. 6 and FIG. 7 show data models of two different approaches for managing APN data.

One example of a data modelling set representative of a manner in which the ME may process APNs in a single file is shown in FIG. 6. As information represented with a question mark in FIG. 6 means the specified data object is optional. The designation of "X+" means that there can be zero to many of the following data set models. FIG. 6 uses OMA DM as the pictorial way of representing the data model but does not imply that OMA DM would be implemented using OMA DM or CP; it is just used to give a visual representation of the data set.

The "Data Modelling Set" includes one or more data set instances, each of which may include the following elements (note that some solutions may omit one or more of the following elements):

PLMN identifier: The HPLMN/Operator/Service Provider that the data set instance is applicable to as identified from the UICC. If this is not present the data set instance is applicable to all Operators. It is encoded as one or a combination of e.g., Mobile Country Code (MCC) and mobile network code (MNC) pair(s), MCC+MNC+1 or more digits from the MSIN, MCC+MNC+1 or more digits from the MSIN and GID1 and/or GID2, SSID, SID, FQDN etc.

EF to use to locate the APNs: The file to use to obtain the APN(s) from the UICC. In order to aid the reader this file will be labelled as EF-FILE EF file Record Identifier Location_in_EF-FILE: The location in the EF-FILE that is being referenced. If this is not present the first location in the referenced file may be used.

APN Usage: What that APN is to be used for. If it is not present the APN is used for Internet setting Example values may include internet, tethering, WAP, MMS, Bootstrapping etc. (or representations of these)

User-input-required: Present if user input is required before a data connection can be activated towards that APN. If this is not present no user input is required.

Optionally this field may be further qualified that external (e.g. user) input is only required when the Registered PLMN (RPLMN) does not match the MCC and MNC fields/portions of the IMSI in the file on the UICC that contains the subscribers identity (e.g. $EF_{IMSI}$) or match any of the entries in the file that identifies networks that are equivalent home networks e.g. $EF_{HPLMNwAcT}$ file (this is also known as "roaming"). External input could consist of but not limited to either or both of:

Providing a prompt. The prompt being presented via GUI or MMI to query the user if the ME should connect to the desired service;

Providing an interface to allow an alternative APN to be entered or selected from an internal list. This provides an opportunity for a user to indicate an alternative APN According to this example, the ME may choose a specific APN from the list of APNs in a single file based on its ordering (e.g. the first on the list, the last on the list, etc.), the ordering of the APNs in the list could be relative to the service the APN is to be used for e.g. first on the list for Internet, second on the list for tethering, third on the list for MMS, fourth on the list for WAP, etc. A blank APN entry value or a specially defined value (e.g. a specific character or specific string of characters) is defined to allow an operator to indicate that a service has no APN value and optionally that the service is barred/prohibited.

One example configuration file, such as an example $EF_{ACL}$ file on a UICC is shown below.

APN
"internet"
"tether.operator.com"
"mms.operator.co.uk"
"wap.operator.ca"

According to a first approach, the ME is configured with the following information (e.g. in ME software or in a configuration file on the ME) that identifies one or more of the following:

1. The UICC file to be used to obtain the APN;
2. If the file should be read from the first entry to the last entry (top to bottom) or from the last entry to the first entry (bottom to top); and
3. the purpose/usage/service of the APN.

At an appropriate time (e.g., upon power up/on, or reset), the ME will:

a) determine that the file as specified in 1) is present on the USIM by reading the file $EF_{UST}$ or $EF_{IST}$ on the ISIM;
b) if the file is present, optionally determine if the file should be read from top to bottom or bottom to top; and
c) determine which entry of the file to use for which Service. The entry of the file may contain an APN "TLV-encoded IE". An APN "TLV-encoded IE" where the length field of the "TLV-encoded IE" is coded as 1 byte and contents coded as 0xFF (hex) may indicate that no APN has been encoded in that APN TLV entry. Alternatively a specific/reserved value of the APN within the APN "TLV-encoded IE" could also indicate that no APN has been encoded in that APN TLV entry.

Note: The length field of the "TLV-encoded IE" coded as 1 byte and its value 0xFF (hex) is here for illustrative purposes and any length and value could be used.

After c) the ME has determined which APN to use for what Service or that no APN is available for that service. For Services that have no APN encoded, the ME may prohibit the user from establishing a PDN connection and/or PDP Context for the Service(s) that have no APN encoded. Optionally, the ME may provide an indication, such as, for example, indicate to the user that the Service(s) that have no APN encoded are barred/prohibited e.g. by displaying a message on a screen associated with the ME, by providing an audible indication via a speaker associated with the ME, by providing haptic feedback (e.g. using vibrating apparatus), by causing an LED to blink a particular color, etc.

For Services that have an APN, how the ME determines to use that APN could be, but is not limited to, the following.

When the ME gets an indication that a data service is required e.g. user input, invocation of an application, change in roaming status, AT command, etc., the ME will use the determined APN. The APN to use might be based on the following:

| | |
|---|---|
| AT command | Tethered service APN is used. |
| Application invocation | Internet APN is used. |
| IMS voice call | IMS APN |
| WAP browser | WAP APN. |
| MMS message to send or fetch | MMS APN |

The ME then initiates a PDN connection request/activation, or requests PDP context activation, using the determined APN. An ME that supports an E-UTRAN/LTE radio interface may provide the determined APN during an LTE attach procedure.

The following provides example standards text for TS 31.102, section 4.2.48 ("$EF_{ACL}$ (Access Point Name Control List)") to implement the use of a single list of APNs in a single file.

If service no 35 is "available", this file shall be present.
This EF contains the list of allowed APNs (Access Point Names). If this file is present in the USIM, the Enabled Services Table ($EF_{EST}$) shall also be present.

| Identifier: '6F57' | Structure: transparent | Optional |
|---|---|---|
| File size: X bytes (X > 1) | | Update activity: low |

Access Conditions:

| READ | PIN |
|---|---|
| UPDATE | PIN2 |
| DEACTIVATE | ADM |
| ACTIVATE | ADM |

| Bytes | Description | M/O | Length |
|---|---|---|---|
| 1 | Number of APNs | M | 1 byte |
| 2 to X | APN TLVs | M | X − 1 byte |

For contents and coding of APN-TLV values see TS 23.003. The tag value of the APN-TLV shall be 'DD'. "Network provided APN" is coded with a TLV object of length zero. A blank APN is coded with a TLV object of length 1 byte. The byte shall be encoded as FF.

NOTE 1: It is recommended that $EF_{ACL}$ contains APNs for the following services: APN TLV position 1 is for Internet, APN TLV position 2 is for MMS, APN "TLV-encoded IE" position 3 is for WAP.

NOTE 2 If an operator does not support a service it is recommended that a blank APN is encoded in that APL "TLV-encoded IE" position.

II. A Single List of APNs in a Single File Arranged Per PLMN

Additionally or alternatively, the ME may choose a specific APN from the list of APNs in a single file based on identifying for the inserted UICC card and (optionally) for a given Service Provider/RPLMN, a file to use on that UICC for APNs, and optionally the location within the file of the APN(s) and/or the purpose of APN(s) and/or whether user input is required before using the APN(s). This information may be stored in a configuration file on the ME. If there is no configuration file for the PLMN associated with the UICC e.g. there is no MCC and MNC that matches any Service Provider/PLMN entry, the ME then uses another generic configuration file.

In such an example, the ME contains a configuration data/file that identifies, for an inserted UICC, and (optionally) for a given PLMN:
  a file to use on that UICC for APNs, and/or
  the location within the file of the APN and/or
  the purpose of APN(s) and/or
  whether user input is required before using the APN.

Figure 7:
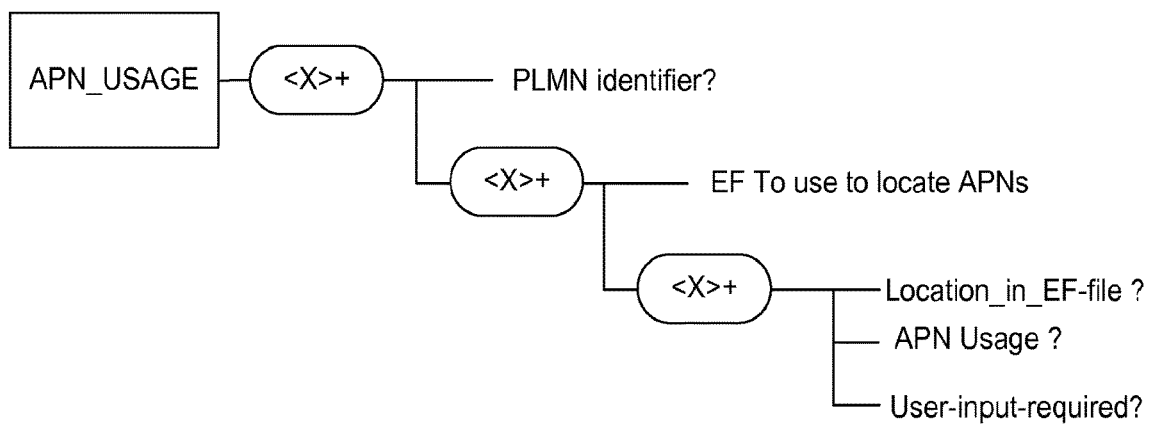

An example data modelling set of a per Service Provider/PLMN configuration is shown in FIG. 7, which is similar to FIG. 6. Note: As with FIG. 6, FIG. 7 uses OMA DM as the pictorial way of representing the data model but does not imply that OMA DM would be implemented using OMA DM or CP; it is just used to give a visual representation of the data set. Information represented with a question mark in FIG. 7 means the specified data object is optional. The designation of "X+" means that there can be zero to many of the following data set models.

The "Data Modelling Set" consists of one or more data set instances, each of which may comprise the following elements (note that some solutions may omit one or more of the following elements):
  PLMN identifier: The HPLMN/Operator/Service Provider that the data set instance is applicable to as identified from the UICC. If this is not present the data set instance is applicable to all Operators. It is encoded as e.g. MCC and MNC pair(s) SSID, MCC+MNC+1 or more digits from the MSIN, MCC+MNC+1 or more digits from the MSIN and GID1 and/or GID2, SID, FQDN etc
  EF to use to locate the APNs: The file to use to obtain the APN(s) from the UICC. In order to aid the reader this file will be labelled as EF-FILE
  EF file Record Identifier
  Location_in_EF-FILE: The location in the EF-FILE that is being referenced. If this is not present the first location in the referenced file may be used.
  APN Usage: What service that APN is to be used for. If it is not present the APN is used for Internet service—Example values may include internet, WAP, MMS, Bootstrapping etc. (or representations of these)
  User-input-required: Present if user input is required before a data connection can be activated towards that APN. If this is not present no user input is required.
    Optionally this field may be further qualified that external (e.g. user) input is only required when the RPLMN does not match the MCC and MNC fields/portions of the IMSI in the file on the UICC that contains the subscribers identity (e.g. $EF_{IMSI}$) or match any of the entries in the file that identifies network that are equivalent home networks e.g. $EF_{HPLMNwAcT}$ file (this is also known as "roaming").
    External (e.g. user) input could consist of but not limited to either or both of:
      Providing a prompt. The prompt being presented via GUI or MMI to query the user if the ME should connect to the desired service;
      Providing interface to allow an alternative APN to be entered or selected from an internal list. This provides an opportunity for a user to indicate an alternative APN
The procedure in the ME is as follows:
The ME reads the Subscriber Identity e.g. IMSI (stored e.g. in $EF_{IMSI}$) from the UICC/USIM/SIM, NAI (stored in the $EF_{IMPI}$ from ISIM), FQDN (stored in the $EF_{DOMAIN}$ from ISIM).
ME sends a message to the UICC to obtain data (e.g. IMSI). Example standardization text is described below.

---
TS 31.102 Section 5.1.1.2 USIM initialisation
......
The ME performs the USIM Service Table request.
......
Afterwards, the ME runs the following procedures if the ME and the USIM support the related services:
  - IMSI request;

---

UE receives back a message from the UICC/USIM/SIM containing data e.g. subscriber identity that could be but not limited to: IMSI, URI, FQDN, NAI, etc.
The ME performs the UICC HPLMN determination procedure e.g. MCC and the MNC of the IMSI with the stored PLMN identifiers of the subscriber identity, a network access identifier (NAI), the domain name part of the subscriber identity with the Service provider which in this example could be an FQDN.
If there is a match then the data set instance from the matched data set instance is used.
If there is no match then the ME checks if there is a data set instance with no Service Provider/PLMN identifier associated with it. If there is a data set instance with no Service Provider/PLMN identifier, then this data set instance shall be used.
The ME uses the chosen data set instance and determines what file (EF-FILE) on the UICC should be used to provide APNs for data connectivity. The ME then determines if the file referenced in the "EF_To_use_to_locate_APNs" leaf/file/data object (EF-FILE) exists in the USIM Service table (e.g. by reading the file $EF_{UST}$) or $EF_{IST}$ on the ISIM (if present). Note: The reading of the $EF_{UST}$/or $EF_{IST}$ may have been performed earlier in the above sequence e.g. before the ME obtained the IMSI. If the file (EF-FILE) exists then the ME may:
a) read the file (EF-FILE) and store some or all of the data from the file (EF-FILE) internally; or
b) read the file (EF-FILE) when the UE needs to set up a data connection (e.g. PDN Connection, PDP Context, etc.) or perform an LTE attach.
In either operation a) or b) the ME determines which APN to use for what data service. A possible implementation is described.
  When the ME gets an indication that a data service is required e.g. user input, invocation of an application, change in roaming status, AT command, etc., the ME will use the determined APN. The APN to use might be based on the following:

| | |
|---|---|
| AT command | Tethered service APN is used. |
| Application invocation | Internet APN is used. |
| IMS voice call | IMS APN |
| WAP browser | WAP APN. |
| MMS message to send or fetch | MMS APN |

Figure 8:
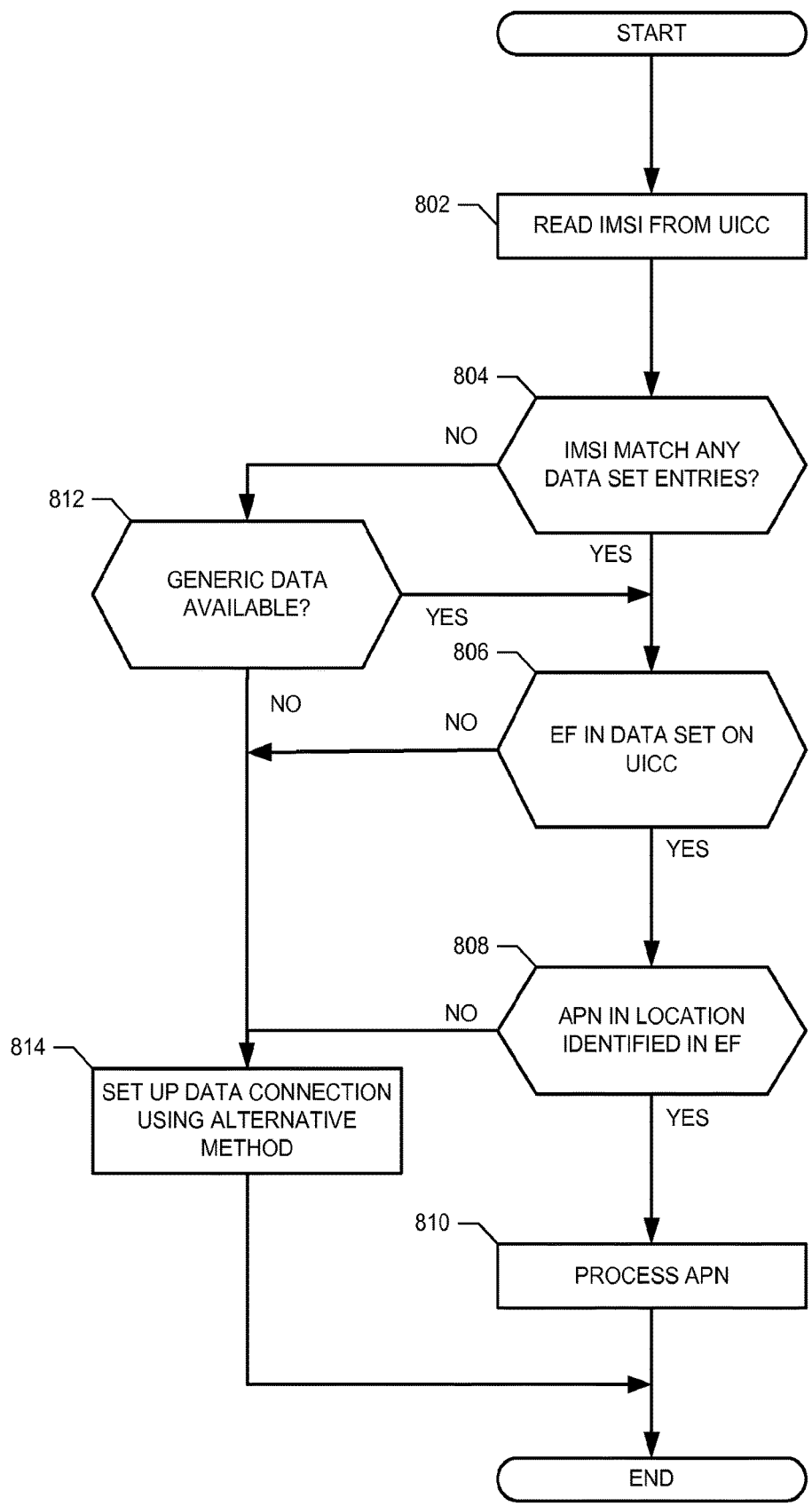
FIGS. 8 and 9 are flow diagrams representative of a process that may be implemented using machine-readable instructions on the ME.
Figure 9:
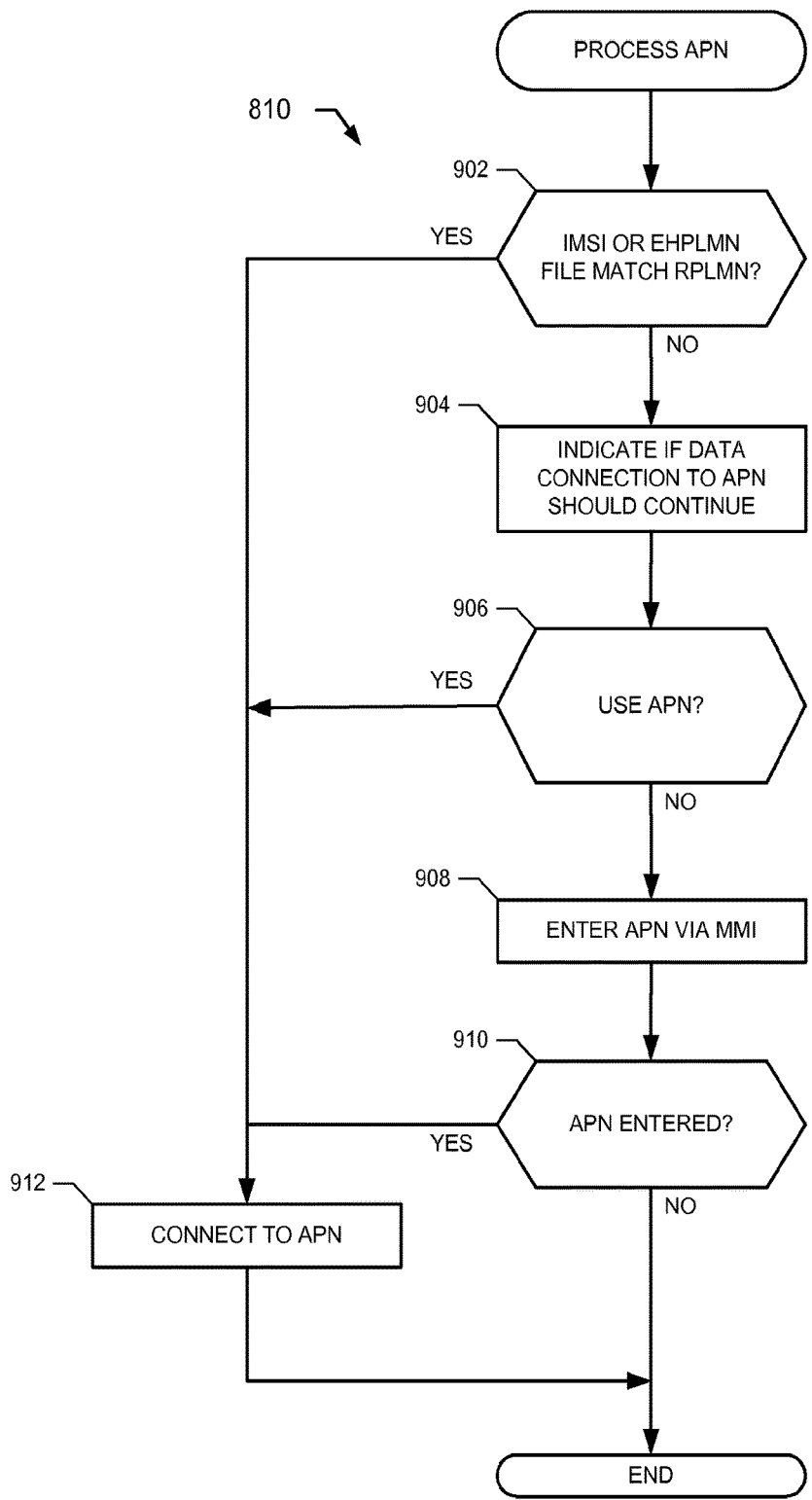

If the User-input-required leaf/file is present then provide an indication, such as, for example, to prompt the user as required. The ME then initiates a PDN connection request, or requests PDP activation, or LTE attach, using the identified APN.
If the file (EF-FILE) does not exist in the USIM Service table (reading file $EF_{UST}$) or $EF_{IST}$ on the ISIM (if present), an APN entry does not exist in the location as identified in "EF_To_use_to_locate_APNs" leaf/file or if the ME is unable to use a data set instance the ME may use another method described in this document to obtain data connectivity or the ME may perform the following:
1) initiate a PDN connection request/activation, PDP Context activation or LTE attach using either a default APN provisioned within the ME or send a blank/empty PS connection request;
2) provide an indication on the display/screen that an APN needs to be entered and upon the user entering an APN perform 1); or
3) provide an indication on the display/screen that the data service is barred/prohibited.
FIGS. 8 and 9 are flow diagram overviews of the above process that takes into account the data described in the data modelling set of FIG. 7. The decision boxes in the flow diagrams represent decisions that could be taken based on data in the Data Modelling Set. If a data item is not present (items that may be omitted are illustrated with a "?" in FIG.

7) then the decision box in the diagram would not be necessary. For example if user-input-required is not required or not present, then the corresponding blocks of FIG. 9 related to user-input-required could be omitted.

The process of FIG. 8, may be carried out or initiated on a number of events such as power up/on, reset, or selection of a new PLMN where the PLMN code received in a message (e.g., the message could be but not limited to the Attach Accept, Location Area Update Accept, Routing Area Update Accept, Tracking Area Update Accept etc.) is not the same as the RPLMN code stored in the ME or an equivalent PLMN to the RPLMN. The ME may repeat any or a subset of the above described or illustrated procedures.

Referring to FIG. 8, the ME reads an IMSI from the UICC inserted into the ME (block 802). The ME performs a UICC HPLMN determination procedure to determine if the IMSI matches any data set entries within one or more files e.g. data file 124 of memory 120, APN information 137 of UICC 136 etc. stored within the ME (block 804). If the IMSI matches data set entries (block 804), the ME determines if there is an elementary file in a data set on the UICC (block 806). If there is an elementary file on the UICC (block 806), the ME determines if there is an APN in a location identified in the elementary file (block 808). If an APN is identified (block 808), the ME processes the APN (block 810), one example of such processing is described in conjunction with FIG. 9.

If, however, there is no IMSI match (block 804), the ME determines if generic data is available (block 812). If generic data is available (block 812), the ME determines if there is an elementary file in the data set on the UICC (block 806). If, however, there is no generic data available (block 812), or there is no elementary file in the data set on the UICC, or there is no APN in the location identified in the elementary file (block 808), the ME sets up a data connection using an alternative method (block 814). In one example, such an alternative method of setting up a data connection includes the known technique of using a blank APN to establish a PD connection.

FIG. 9 is one example of a technique to process an APN, which is one example implementation of block 810 of FIG. 8. According to FIG. 9, the ME uses a UICC HPLMN determination procedure to determine if the IMSI or an entry of the EHPLMN file matches (e.g., $EF_{HPLMNwAcT}$ file) a registered PLMN (RPLMN) (block 902). If there is no match (block 902), an indication is provided as to whether a data connection to an APN should continue (block 904). The ME determines if the APN should be utilized (block 906) and, if the APN should not be utilized, the ME may receive an APN via a man-machine interface (MMI) e.g., from a user in response to prompting presented via a GUI (block 908). If no APN is entered (block 910), the process ends.

Alternatively, if there is an IMSI or EHPLMN file that matches an RPLMN (block 902), or if an APN is to be used (block 906), or if an APN is entered by a person (block 910), the ME connects to the indicated APN (block 912).

III. Using an Index in One File that Points to an APN within the Same File

In this solution, data structures in one file combine to enable the storage and indication of a many-to-many relationship between APNs and the services they provide. In this solution the UICC has a single file, and within the single file are 2 data structures. The first data structure maps an identifier/indicator that identifies a service to an APN pointer. The second data structure lists APNs, and (optionally) labels them by means of APN pointers. The single file can either be a new file within the UICC or an existing file could be extended e.g. $EF_{ACL}$ where the identifiers are appended to the existing $EF_{ACL}$ data structure.

One feature of the present solution is that it allows many-to-many mappings/relationship of APNs to services and avoids the need to store duplicate copies of a given APN, which in turn can decrease the storage space required to store the single file.

The solution could be extended to allow a new UICC file to reference an existing UICC file e.g. a new file can be defined that identifies the identifier/indicator and for each identifier identify the location within an existing file e.g. $EF_{ACL}$ where the APN can be located for that service.

In this solution the UICC has single file, and within the single file are two data structures. The first data structure maps an identifier/indicator that identifies a service to an APN pointer. The identification of the service would be by standardization e.g. the identifier "A" represents Internet service, "B" represents Tethered data, etc. The second data structure lists APNs, and (optionally) labels them by means of APN pointers.

Three possible variations are listed below. The first variation has characters as an identifier, the second variation has hex values and the third variation has binary values. In each example for each identifier listed there is a service. So "A", "0x01" and "00000001" all are associated with the Internet service.

The following tables are possible standardized lists of Services and their associated identifiers, where the identifiers are respectively characters, hex values and binary values:

| Service Identifier | Service indicated by this identifier |
|---|---|
| A | Internet |
| B | Tethered data |
| C | MMS |
| D | WAP |

| Service Identifier | Service indicated by this identifier |
|---|---|
| 0x01 | Internet |
| 0x02 | Tethered data |
| 0x03 | MMS |
| 0x04 | WAP |

| Service Identifier | Service indicated by this identifier |
|---|---|
| 00000001 | Internet |
| 00000010 | Tethered data |
| 00000011 | MMS |
| 00000100 | WAP |

An example of the first data structure is as follows (note that the representation of the APN pointer may be by any appropriate means):

| Service Identifier | APN pointer |
|---|---|
| 00000001 | APN1 |
| 00000010 | APN2 |

-continued

| Service Identifier | APN pointer |
|---|---|
| 00000011 | APN2 |
| 00000100 | APN1 |

In the second data structure, the APN pointer as described above is mapped to a string of characters representing an APN. In the examples below, the identifier "00000001" is thus mapped to APN "internet".

| APN pointers | APN |
|---|---|
| APN1 | "internet" |
| APN2 | "tether.operator.com" |
| APN3 | "mms.operator.co.uk" |
| APN4 | "wap.operator.ca" |

The benefit of the above solution is that it allows a many-to-many mappings/relationship of APNs to services and avoids the need to store duplicate copies of a given APN.

In a particular example, the APN pointer may be implicit in the second data structure, for example, may be defined according to the order of the APN entry within the structure. In a further particular example, the first data structure may be included in (e.g. appended to) an existing file such as the $EF_{ACL}$ file (for example in a backwards-compatible manner), such that compliant MEs can obtain both the list of APNs (i.e. the second data structure) and the mapping of services to APNs (i.e. the first data structure) from the same file and without requiring the standardization of an additional file.

In an alternative example, the two data structures may be in different files; in an example of this type, the $EF_{ACL}$ file may contain the second data structure. When the ME reads this data, the ME may obtain the following mapping:

| Service | APN |
|---|---|
| Internet | "internet" |
| Tethered data | "tether.operator.com" |
| MMS | "tether.operator.com" |
| WAP | "internet" |

The file may be read in a number of different ways, which are described below as example implementations.

a. Implementation A

In this implementation, if the ME receives an indication from the USIM service table $EF_{UST}$ that service no abcd is "available" then the ME:

a) reads the file and stores some or all of the data internally; and/or
b) reads the file when the UE needs to initiate a data connection (e.g. PDN Connection, PDP Context, etc.) or initiate an LTE attach.

In this implementation when the UE reads the TAG value 'DD' within the $EF_{APN-Conf}$ file then the ME knows that the data following the TAG will be an APN and an identifier. The ME will create a mapping between this identifier and the corresponding identifier value that followed a TAG value of 'DE' in the same $EF_{APN-Conf}$ file to determine the purpose of the APN.

The following provides example standards text for 3GPP TS 31.102.

Section x.y.z. $EF_{APN-Conf}$(Access Point Name Control List)
If service no xy is "available", this file shall be present.
This EF contains the list of APNs (Access Point Names) and what they are used for. If this file is present in the USIM, the Enabled Services Table ($EF_{EST}$) shall also be present.

| Identifier: 'abcd' | Structure: transparent | Optional |
|---|---|---|
| File size: X bytes (X > 1) | | Update activity: low |
| Access Conditions: | | |
| READ | PIN | |
| UPDATE | PIN2 | |
| DEACTIVATE | ADM | |
| ACTIVATE | ADM | |

| Bytes | Description | M/O | Length |
|---|---|---|---|
| 1 | Number of APN identifiers and APNs | M | 1 byte |
| 2 to X | APN identifier | M | X − 1 byte |
| X + 1 to Y | APN TLVs | M | Y − 1 byte |

Number of APN identifiers and APNs
This byte field identifies the number of corresponding APN identifiers/APN TLVs sets/data pairs.
APN Identifier. Tag Value 'DE'
Content:
  Unique Identifier that identifies the APN purpose.
Coding:
  Octets:

| | TAG | Identifier | Purpose |
|---|---|---|---|
| Octets: | 1 | Variable | Variable |

Identifier Coding:
[Implementation 1] Binary number in a single Byte
[Implementation 2] Alphanumeric string coded as defined in TS 23.038
Purpose Coding:
Alphanumeric string coded as defined in TS 23.038
APN TLVs. Tag Value 'DD'
Content:
  An APN and its associated APN identifier.
Coding:
  Octets:

| | TAG | Identifier | APN |
|---|---|---|---|
| Octets: | 1 | Variable | Variable |

Identifier Coding:
[Implementation 1] Binary number in a single Byte
[Implementation 2] Alphanumeric string coded as defined in TS 23.038
APN Coding:
Alphanumeric string coded as defined in TS 23.038 b. Implementation B

In this implementation the ME will read the $EF_{ACL}$ file. After reading the APN values stored in the "APN TLV" field(s) the ME will next determine the number of Service Identifiers and read all of the Service Identifiers. For each Service Identifier, the ME will read the associated EF file Record Identifier that identifies which of the APNs in the $EF_{ACL}$ file map to one or more Service Identifiers.

The following provides example standards text for 3GPP TS 31.102. This implementation takes an existing EF file, the $EF_{ACL}$, and extends it by adding additional information elements to the end/bottom. The new information element describes the Service Identifier and which record (APN) within the $EF_{ACL}$ maps to that Service Identifier.

Section x.y.z. $EF_{ACL}$ (Access Point Name Control List)
If service no 35 is "available", this file shall be present.
This EF contains the list of allowed APNs (Access Point Names). If this file is present in the USIM, the Enabled Services Table ($EF_{EST}$) shall also be present.

| Identifier: '6F57' | Structure: transparent | Optional |
|---|---|---|
| File size: X bytes (X > 1) | | Update activity: low |

Access Conditions:

| READ | PIN |
|---|---|
| UPDATE | PIN2 |
| DEACTIVATE | ADM |
| ACTIVATE | ADM |

| Bytes | Description | M/O | Length |
|---|---|---|---|
| 1 | Number of APNs | M | 1 byte |
| 2 to X | APN TLVs | M | X − 1 byte |
| | Number of Service Identifiers | M | 1 byte |
| | Service Identifier | M | Y byte |

For contents and coding of APN-TLV values see TS 23.003. The tag value of the APN-TLV shall be 'DD'. "Network provided APN" is coded with a TLV object of length zero.

Service Identifier. Tag Value 'DE'
Content:
Contains an service identifier and identifies the location of what APN to use for that service identifier.
Coding:
Octets:

| TAG | Service Identifier | EF file Record Identifier |
|---|---|---|
| Octets: 1 | Variable | 1 |

Service Identifier Coding:
[Implementation 1] Binary number in a single Byte
[Implementation 2] Alphanumeric string coded as defined in TS 23.038
Purpose Coding:
Alphanumeric string coded as defined in TS 23.038
EF file Record Identifier
Content:
record identifier within this file.
Coding:
'xx'—record identifier of the corresponding EF record.
c. Implementation C
In this implementation the ME will read the $EF_{APN\text{-}Conf}$ file. This file contains a number of Service Identifiers and the purpose/service/usage of the Service Identifiers. The purpose of the Service Identifiers is identified by an EF file SFI (identifies the file in the UICC that contains the APN) and the EF file Record Identifier that identifies the individual record within the EF file as pointed to by the EF file SFI. The ME will then read each of the APNs referenced by the EF file SFI and associated record within that file and create a relationship between the Service Identifier and corresponding APN.

The following provides example standards text for 3GPP TS 31.102.
Section x.y.z. $EF_{APN\text{-}Conf}$ (Access Point Name Control List)
If service no xy is "available", this file shall be present.
This EF contains a list of Service Identifiers and which UICC file and location within that file should be used to identify what APN to use. If this file is present in the USIM, the Enabled Services Table ($EF_{EST}$) shall also be present.

| Identifier: 'abcd' | Structure: transparent | Optional |
|---|---|---|
| File size: X bytes (X > 1) | | Update activity: low |

Access Conditions:

| READ | PIN |
|---|---|
| UPDATE | PIN2 |
| DEACTIVATE | ADM |
| ACTIVATE | ADM |

| Bytes | Description | M/O | Length |
|---|---|---|---|
| 1 | Number of Service Identifiers | M | 1 byte |
| 2 to X | Service Identifier | M | X − 1 byte |

Service Identifier. Tag Value 'DE'
Content:
Contains an service identifier and identifies the location of what APN to use for that service identifier.
Coding:
Octets:

| TAG | Service Identifier | EF file SFI | EF file Record Identifier |
|---|---|---|---|
| Octets: 1 | Variable | 1 | 1 |

Service Identifier Coding:
[Implementation 1] Binary number in a single Byte
[Implementation 2] Alphanumeric string coded as defined in TS 23.038
Purpose Coding:
Alphanumeric string coded as defined in TS 23.038
EF File SFI.
Content:
Short File Identifier of the associated EF file. E.g $EF_{ACL}$
Coding:
as defined in the UICC specification.
EF File Record Identifier
Content:
record identifier of the associated EF file.
Coding:
'xx'—record identifier of the corresponding EF record.
d. Implementation D
This implementation is similar to implementation C except that instead of each Service Identifier having an EF file SFI only one EF file SFI is defined and is common for all of the Service Identifiers. The ME will then read the file associated with the EF file SFI and create a mapping between the Service Identifier and the corresponding APN identified by the EF file Record Identifier.

A possible implementation is described as follows. When the ME gets an indication that a data service is required e.g. user input, invocation of an application, change in roaming status, AT command, etc., the ME will use the correct APN. The APN to use might be based on the following:

| | |
|---|---|
| AT command | Tethered service APN is used. |
| Application invocation | Internet APN is used. |
| IMS voice call | IMS APN |
| WAP browser | WAP APN |
| MMS message to send or fetch | MMS APN |

The ME then initiates a PDN connection request/activation, requests PDP activation, or initiates an LTE attach using the identified APN.

The following provides example standards text for 3GPP TS 31.102.

Section x.y.z. $EF_{APN-Conf}$ (Access Point Name Control List)
If service no xy is "available", this file shall be present.
This EF contains a list of Service Identifiers and which UICC file and location within that file should be used to identify what APN to use. If this file is present in the USIM, the Enabled
Services Table ($EF_{EST}$) shall also be present.

| | | | |
|---|---|---|---|
| Identifier: 'abcd' | Structure: transparent | | Optional |
| File size: X bytes (X > 1) | | Update activity: low | |

| Access Conditions: | |
|---|---|
| READ | PIN |
| UPDATE | PIN2 |
| DEACTIVATE | ADM |
| ACTIVATE | ADM |

| Bytes | Description | M/O | Length |
|---|---|---|---|
| 1 | EF file SFI | M | 1 |
| 2 | Number of Service Identifiers | M | 1 byte |
| 3 to X | Service Identifier | M | X − 2 byte |

EF File SFI.
Content:
  Short File Identifier of the associated EF file. E.g $EF_{AC}$
Coding:
  as defined in the UICC specification.
Service Identifier. Tag Value 'DE'
Content:
  Contains an service identifier and identifies the location of what APN to use for that service identifier.
Coding:
  Octets:

| | TAG | Service Identifier | EF file Record Identifier |
|---|---|---|---|
| Octets: | 1 | Variable | 1 |

Service Identifier Coding:
[Implementation 1] Binary number in a single Byte
[Implementation 2] Alphanumeric string coded as defined in TS 23.038
Purpose Coding:
Alphanumeric string coded as defined in TS 23.038
EF File Record Identifier
Content:
  record identifier of the associated EF file.
Coding:
  'xx'—record identifier of the corresponding record.
IV. Using a File to Associate APNs and Services
  In this solution a new UICC EF is defined that contains a number of APNs. For each APN the service or services that the APN provides is attached/defined/indicated. The service(s) of the APN is encoded using either 1 of 2 ways:

a) A binary encoding is used where a single bit represents a single service that the APN provides. This allows a single APN to be defined that can provide multiple (i.e. two or more) services.

b) Instead of having a single Tag value that identifies that an APN is encoded in the following bytes, multiple Tag values are defined. Each Tag value identifies a single service that the APN provides e.g. Tag value 71=Internet, Tag value 72=WAP etc.

a. Implementation 1
  An example $EF_{UST}$ file is shown below.
Section x.y.z. $EF_{UST}$ (USIM Service Table)
This EF indicates which services are available. If a service is not indicated as available in the USIM, the ME shall not select this service.

| | | | |
|---|---|---|---|
| Identifier: '6F38' | Structure: transparent | | Mandatory |
| SFI: '04' | | | |
| File size: X bytes, (X ≥ 1) | | Update activity: low | |

| Access Conditions: | |
|---|---|
| READ | PIN |
| UPDATE | ADM |
| DEACTIVATE | ADM |
| ACTIVATE | ADM |

| Bytes | Description | M/O | Length |
|---|---|---|---|
| 1 | Services no 1 to no 8 | M | 1 byte |
| 2 | Services no 9 to no 16 | O | 1 byte |
| 3 | Services no 17 to no 24 | O | 1 byte |
| 4 | Services no 25 to no 32 | O | 1 byte |
| etc. | | | |
| X | Services no (8X − 7) to no (8X) | O | 1 byte |

Services
  Service no 1: Local Phone Book
Contents:
  Service no 2: Fixed Dialing Numbers (FDN)
  Service no 3: Extension 2
  Service no 96 Non-Access Stratum configuration by USIM
  Service no 97 PWS configuration by USIM
  Service no 98 Poll Interval negotiation
  Service no abcd Access Point Name Configuration file
  (Note that for all UICC embodiments in this paper the above existing file might have to be updated in a similar manner).
  A new EF is defined as follows:
4.2.48 $EF_{APN-Conf}$ (Access Point Name Configuration File)
  If service no abcd is "available", this file shall be present.
  This EF contains the list of APNs (Access Point Names) and what each APN is used for.

| | | | |
|---|---|---|---|
| Identifier: 'XXXX' | Structure: transparent | | Optional |
| File size: X bytes (X > 1) | | Update activity: low | |

| Access Conditions: | |
|---|---|
| READ | PIN |
| UPDATE | PIN2 |
| DEACTIVATE | ADM |
| ACTIVATE | ADM |

| Bytes | Description | M/O | Length |
|---|---|---|---|
| 1 | Number of APN identifiers | M | 1 byte |
| 2 to X | APN identifier | M | X − 1 byte |

APN Identifier.
Content:
  Unique Identifier that identifies the APN and its use.
Coding:

|  | APN Usage | APN Length | APN |
|---|---|---|---|
| Octets: | 1 | 1 | Variable |

Figure X+1: APN Usage
  The Usage Encoding is a 1-octet sub-field whose format is defined as:
  Bit encoding allows a single APN to be configure to support multiple ME services.

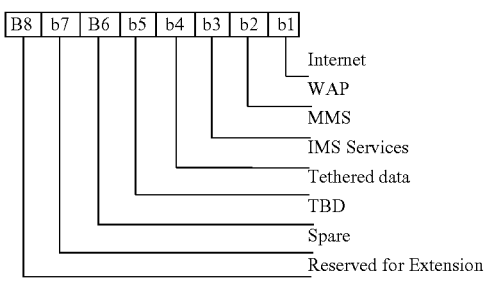

Or
  '00'—The APN is for Internet Services
  '01'—The APN is for WAP Services
  '02'—The APN is for MMS Services
  '03'—The APN is for IMS Services
  '04'—The APN is for Tethered Services
  All other values are RFU
For contents and coding of APN-TLV values see TS 23.003. The tag value of the APN-TLV shall be 'XX'. "Network provided APN" is coded with a TLV object of length zero.

Annex A (Informative):
EF changes via Data Download or USAT applications
This annex defines if changing the content of an EF by the network (e.g. by sending an SMS), or by a USAT Application, is advisable. Updating of certain Efs "over the air" such as $EF_{ACC}$ could result in unpredictable behaviour of the UE; these are marked "Caution" in the table below. Certain Efs are marked "No"; under no circumstances should "over the air" changes of these Efs be considered.

| File identification | Description | Change advised |
|---|---|---|
| '2F00' | Application directory | Caution |
| ... | ... | ... |
| '6FEB' | Max value of Secure Channel counter | Caution |
| '6FEC' | Public Warning System | Yes |
| 'XXXX' | Access Point Name Configuration file | Yes or Caution |

NOTE1:
If $EF_{IMSI}$ is changed, the UICC should issue REFRESH as defined in TS 31.111 and update $EF_{LOCI}$, $EF_{PSLOCI}$ and $EF_{EPSLOCI}$ accordingly.
NOTE2:
This file may contain eCALL related test and reconfiguration numbers.
NOTE3:
If $EF_{UICCIARI}$ is changed, the UICC shall issue a REFRESH command as defined in TS 31.111. The ME shall read the updated list of IARIs associated with active applications installed on the UICC.

Annex D (Informative):
Tags defined in 31.102

| Tag | Name of Data Element | Usage |
|---|---|---|
| '53' | MBMS Data Object | AUTHENTICATE command parameter, in MBMS security context |
| ... | ... | ... |
| 'DD' | Access Point Name | APN Control List ($EF_{ACL}$) |
| 'DD' | GBA Security Context Bootstrapping Mode tag | AUTHENTICATE command parameter, in GBA security context |
| 'DE' | GBA Security Context NAF Derivation Mode tag | Response to AUTHENTICATE |
| 'XX' | APN-TLV | Defines default APN for specific services |

NOTE:
the value 'FF' is an invalid tag value. For ASN.1 tag assignment rules see ISO/IEC 8825-1 b. Implementation 2
The following is an alternative implementation. The only difference between Implementation 1 and Implementation 2 is how the use/service of the APN is encoded. In this example it is encoded via the Tag value, whereas before it was a bit field or an integer value.
4.2.48 $EF_{APN-Conf}$(Access Point Name Configuration File)
  If service no xx is "available", this file shall be present.
  This EF contains the list of APNs (Access Point Names) and what each APN is used for.

| Identifier: 'XXXX' | Structure: transparent | Optional |
|---|---|---|
| File size: X bytes (X > 1) |  | Update activity: low |

| Access Conditions: | |
|---|---|
| READ | PIN |
| UPDATE | PIN2 |
| DEACTIVATE | ADM |
| ACTIVATE | ADM |

| Bytes | Description | M/O | Length |
|---|---|---|---|
| 1 | Number of APNs | M | 1 byte |
| 2 to X | APN TLVs | M | X − 1 byte |

APN TLVs.
Content:
  Identifies what the APN is used for.
Coding:
  Contains APN in Tag Length format see TS 23.003 and its purpose. The following tag values are defined:

| Tag Value | Service indicated by this identifier |
|---|---|
| X1 | Internet |
| X2 | Tethered data |
| X3 | MMS |
| X4 | WAP |

Annex D (Informative):
Tags defined in 31.102

| Tag | Name of Data Element | Usage |
|---|---|---|
| '53' | MBMS Data Object | AUTHENTICATE command parameter, in MBMS security context |
| ... | ... | ... |

-continued

| Tag | Name of Data Element | Usage |
|---|---|---|
| 'DD' | Access Point Name | APN Control List ($EF_{ACL}$) |
| 'DD' | GBA Security Context Bootstrapping Mode tag | AUTHENTICATE command parameter, in GBA security context |
| 'DE' | GBA Security Context NAF Derivation Mode tag | Response to AUTHENTICATE |
| 'X1' | APN-TLV - Internet APN | Defines default APN for Internet APN |
| 'X2' | APN-TLV - Tethered data APN | Defines default APN for Tethered data APN |
| 'X3' | APN-TLV - MMS APN | Defines default APN for MMS APN |
| 'X4' | APN-TLV - WAP APN | Defines default APN for WAP APN |

Values X1, X2, X3, etc. are used here to represent actual values which may be set to any available (i.e. unused) values.

V. Using an Index in One File that Points to an APN Within Another File

In this solution, the ME, for certain services, chooses an APN to use using two files on the UICC (that may reside on SIM, USIM, ISIM or a combination of these). The first file contains one or more records with at least two fields: the first field holds an identifier/indicator of a service and the second field holds a pointer to an APN.

For the first field, the identifier/indicator of a service could be a string of characters e.g. representing a brief explanation of the service (e.g. "internet", "tethering", "MMS", etc.), or the identifier/indicator of a service could be an identifier that represents different services e.g. an identifier value of 1 could indicate an Internet service, an identifier value of 2 could indicate a Tethered data service, etc. This is depicted in the table below:

| Service Identifier | Service indicated by this identifier |
|---|---|
| 1 | Internet |
| 2 | Tethered data |
| 3 | MMS |
| 4 | WAP |

The second field could indicate a record in another file where the APN can be found e.g. indicate a record/entry in the $EF_{ACL}$ file, indicate a record/entry in a new file that lists APNs. The example tables below illustrate an example set of data for the first file that contains the first field of the first file (denoted as "Service Identifier" in both tables) and the second field of the first file (denoted as "Record/Entry Number of second file" and "APN Identifier").

| Service Identifier | Record/Entry Number of second file |
|---|---|
| 1 | 1 |
| 2 | 2 |
| 3 | 3 |
| 4 | 3 |

| Service Identifier | APN Identifier |
|---|---|
| 1 | 1 |
| 2 | 2 |
| 3 | 3 |
| 4 | 3 |

The second file could be a single list of APNs, and could be the $EF_{ACL}$ file. Alternatively the second file could consist of two fields: the first field containing an identifier for the entry/record (e.g. a number) and the second field containing an APN. The example table below illustrates an example set of data for the second file that contains the first field for the second file (denoted as "APN Identifier or Record/Entry Number") and second field for the second file (denoted as "APN"):

| APN Identifier or Record/Entry Number | APN |
|---|---|
| 1 | "internet" |
| 2 | "tether.operator.com" |
| 3 | "wap.operator.co.uk" |

Method A

In this implementation there are 2 files stored in the UICC, File A and File B. File A describes/lists the APNs and File B describes/lists the usage description of an APN. In one example, File A listing the APNs may be the existing $EF_{ACL}$ file. In this case, File B includes an indication of the usage of one or more of the APNs in the $EF_{ACL}$ file and a reference (e.g. a position in the list of APNs) of the APN in the $EF_{ACL}$ file.

The table below illustrates a further example where File A contains APNs identified by FQDNs e.g. www.internet-.com, and then there is a SFI (XX) followed by a position within the SFI, in this example "01" which represents the first entry in the file SFI (XX). In this example, XX represents a value of the SFI. SFIs are usually hexadecimal figure.

| File A | File B (SFI = XX) |
|---|---|
| www.internet.com XX01 | Record 1 = internet |
| www.WAP.com XX03 | Record 2 = MMS |
| www.MMS.com XX02 | Record 3 = WAP |

Section x.y.z. $EF_{APN-Conf}$(Access Point Name Configuration File)

This EF contains extension data of an $EF_{APN-Conf}$(Access Point Name Configuration file—see 4.2.64).

| Identifier: 'XXXX' | Structure: transparent | Optional |
|---|---|---|
| File size: X bytes (X > 1) | | Update activity: low |
| Access Conditions: | | |
| READ | PIN | |
| UPDATE | PIN2 | |
| DEACTIVATE | ADM | |
| ACTIVATE | ADM | |

-continued

| Bytes | Description | M/O | Length |
|---|---|---|---|
| 1 | Number of APNs and EFs | M | 1 byte |
| I3 to X | APN TLVs | M | X − 1 byte |
| X + 1 to X + 2 | EF file SFI | M | 1 byte |
| X + 3 to X + 4 | EF file Record Identifier | M | 1 byte |

For contents and coding of APN-TLV values see TS 23.003. The tag value of the APN-TLV shall be "XX". "Network provided APN" is coded with a TLV object of length zero.

Number of APNs and EF

This byte identifies how many APN/EF pairs are in the record.

EF file SFI.

Content:
  Short File Identifier of the associated EF file.
Coding:
  as defined in the UICC specification.

EF File Record Identifier
  NOTE: This will contain the SFI that represents $EF_{EXTY}$ (ExtensionY)
Content:
  record identifier of the associated Extension Y entry.
Coding:
  'xx'—record identifier of the corresponding EF record.

Section x.y.z. $EF_{EXTY}$(ExtensionY)

If service n° xyzk is "available", this file shall be present. This EF contains a list of the purpose(s) that APN's can be used for.

| Identifier: 'xyzk' | Structure: transparent | Optional |
|---|---|---|
| File size: X bytes (X > 1) | | Update activity: low |

Access Conditions:

| READ | PIN |
|---|---|
| UPDATE | PIN2 |
| DEACTIVATE | ADM |
| ACTIVATE | ADM |

| Bytes | Description | M/O | Length |
|---|---|---|---|
| 1 | Number of APNs | M | 1 byte |
| 2 to X | APN Usage | M | X − 1 byte |

APN Usage. Tag value 'DE'
Content:
  Unique Identifier that identifies the purpose of an APN.
Coding:
  '00'—The APN is for Internet Services
  '01'—The APN is for WAP Services
  '02'—The APN is for MMS Services
  '03'—The APN is for IMS Services
  '04'—The APN is for Tethered Services
  All other values are RFU Method B In this implementation there is a first file, e.g. $EF_{APN-Conf}$, which contains the APN value. Appended to the APN value is an identifier. Appended to the identifier is the location, which is an EF file identifier that identifiers the EF that should be searched by the ME to determine what that identifier means. For the second EF, $EF_{EXTY}$, the ME needs to search for the identifier that was read in the file $EF_{APN-Conf}$. Once the identifier has been found its meaning can be determined.

Section x.y.z $EF_{APN-Conf}$(Access Point Name Configuration File)

This EF contains extension data of an $EF_{APN-Conf}$ Access Point Name Configuration file—see 4.2.64).

| Identifier: 'XXXX' | Structure: transparent | Optional |
|---|---|---|
| File size: X bytes (X > 1) | | Update activity: low |

Access Conditions:

| READ | PIN |
|---|---|
| UPDATE | PIN2 |
| DEACTIVATE | ADM |
| ACTIVATE | ADM |

| Bytes | Description | M/O | Length |
|---|---|---|---|
| 1 | Number of APNs and EF locations | M | 1 byte |
| 2 to X | APN TLVs | M | X − 1 bytes |
| X + 1 to X + 2 | EF location | M | Y bytes |

For contents and coding of APN-TLV values see TS 23.003. The tag value of the APN-TLV shall be 'XX'. "Network provided APN" is coded with a TLV with length zero.

Number of APN and EF locations

This byte identifies how many APN/EF pairs are in the record

EF locationI. Tag value YY

| EF location | M | 1 byte |
|---|---|---|
| Length | M | 1 byte |
| EF file SFI | M | 1 byte |
| Identifier | M | Y bytes |

EF file SFI Tag "XX"
  NOTE: This tag identifies that the reading entity should look in the file identified by the EF file SFI and look for the "identifier" identified in the "identifier" field
Content:
  Short File identifier of the associated EF file.
Coding:
  as defined in the UICC specification.
EF file Record Identifier
Identifier Content:
  Entry in the EF file identified by the SFI.
Coding:
  Implementation 1
Binary number in a single Byte
  Implementation 2
Alphanumeric string coded as defined in TS 23.038

Section x.y.z. $EF_{EXTY}$(ExtensionY)

If service no xyzk is "available", this file shall be present. This EF lists the purpose(s) an APN can be used for.

| Identifier: 'xyzk' | Structure: transparent | Optional |
|---|---|---|
| File size: X bytes (X > 1) | | Update activity: low |

Access Conditions:

| READ | PIN |
|---|---|
| UPDATE | PIN2 |
| DEACTIVATE | ADM |
| ACTIVATE | ADM |

-continued

| Bytes | Description | M/O | Length |
|---|---|---|---|
| 1 | Number of Entries | M | 1 byte |
| 2 to X | Identifier | M | X − 1 byte |

APN Usage. Tag value 'DE'
Content:
　Unique Identifier that identifies the purpose of an APN.
Coding:
　Identifier. Tag value YY

| Description | M/O | Length |
|---|---|---|
| Identifier Tag | M | 1 byte |
| Length | M | 1 byte |
| Identifier value | M | 1 or X bytes |
| Identifier meaning | M | Y bytes |

Identifier
Content:
　Unique Identifier that identifies the purpose of the identifier.
Coding:
　Implementation 1
Binary number in a single Byte
　Implementation 2

| Description | M/O | Length |
|---|---|---|
| Length | M | 1 byte |
| Identifier | M | X bytes |

Alphanumeric string coded as defined in TS 23.038
Identifier meaning
Content:
　The purpose of the identifier.
Coding:

| Description | M/O | Length |
|---|---|---|
| Length | M | 1 byte |
| Identifier | M | X bytes |

Alphanumeric string coded as defined in TS 23.038

The foregoing techniques may be used with one another. For example, the ME determines if the required UICC file is present e.g. by reading the $EF_{UST}$ parameter (see above). If the required UICC file is present, the ME will read the file and determine what APN should be used for what service based on the descriptions elsewhere in this document. If the UICC file is not present or the ME is unable to determine what APN should be used for a service, the ME may use either of the approaches described above regarding a single list of APNs in a single file.

The systems, methods, apparatus, and articles of manufacture described herein provide numerous features, such as, for example, no modification required to existing UICCs (or minimal modification), no modification to network infrastructure or UE-network protocols, no communication between the ME vendor and the network operator, the UE may attempt to initiate multiple PS data connections if there are different APNs listed in the USIM file, data may be updated using existing SIM-OTA techniques.

Although certain example apparatus, methods, and articles of manufacture are described herein, other implementations are possible. The scope of coverage of this patent is not limited to the specific examples described herein. On the contrary, this patent covers all apparatus, methods, and articles of manufacture falling within the scope of the invention.

What is claimed is:

1. A method for use in a mobile equipment, the method comprising:
　reading an International Mobile Subscriber Identity (IMSI) from a memory device associated with the mobile equipment;
　determining that part or all of the IMSI matches a data set entry within a file associated with the mobile equipment;
　after determining that part or all of the IMSI matches the data set entry within the file associated with the mobile equipment, determining that an elementary file is on the memory device;
　after determining that the elementary file is on the memory device, determining that an access point name is stored in a location identified in the elementary file; and
　after determining that the access point name is stored in the location identified in the elementary file, using the access point name to connect the mobile equipment to a mobile network.

2. The method of claim 1, wherein the memory device associated with the mobile equipment comprises a Universal Integrated Circuit Card.

3. The method of claim 1, wherein the file associated with the mobile equipment comprises a file native to the mobile equipment.

4. The method of claim 1, wherein determining that part or all of the IMSI matches a data set entry within a file associated with the mobile equipment comprises determining that part or all of the IMSI matches any of a plurality of data set entries.

5. The method of claim 1, wherein the elementary file is stored in a Universal Integrated Circuit Card.

6. The method of claim 1, wherein using the access point name to facilitate a connection between the mobile equipment and the mobile network comprises connecting to the mobile network using the access point name.

7. The method of claim 1, wherein using the access point name to facilitate a connection between the mobile equipment and the mobile network comprises receiving an indication of a second access point name via a user interface and connecting to the mobile network using the second access point name.

8. A mobile device comprising:
　an interface to communicate with a memory device; and
　a processor in communication with the interface, the processor programmed to:
　　read an International Mobile Subscriber Identity (IMSI) from the memory device in communication with the interface;
　　determine that part or all of the IMSI matches a data set entry within a file associated with the mobile device;
　　after determining that part or all of the IMSI matches the data set entry within the file associated with the mobile device, determine that an elementary file is on the memory device;
　　after determining that the elementary file is on the memory device, determine that an access point name is stored in a location identified in the elementary file; and after determining that the access point name is stored in the location identified in the elementary file, use the access point name to connect the mobile device to a mobile network.

9. The mobile device of claim 8, wherein the memory device associated comprises a Universal Integrated Circuit Card.

10. The mobile device of claim 8, wherein the file associated with the mobile device comprises a file native to the mobile device.

11. The mobile device of claim 8, wherein determining that part or all of the IMSI matches a data set entry within a file associated with the mobile device comprises determining that the IMSI matches any of a plurality of data set entries.

12. The mobile device of claim 8, wherein the elementary file is stored in a Universal Integrated Circuit Card.

13. The mobile device of claim 8, wherein using the access point name to facilitate a connection between the mobile device and the mobile network comprises connecting to the mobile network using the access point name.

14. The mobile device of claim 8, wherein using the access point name to facilitate a connection between the mobile device and the mobile network comprises receiving an indication of a second access point name via a user interface and connecting to the mobile network using the second access point name.

15. A non-transitory computer readable medium comprising instructions that, when executed, cause a mobile equipment to at least:
  read an International Mobile Subscriber Identity (IMSI) from a memory device associated with the mobile equipment;
  determine that part or all of the IMSI matches a data set entry within a file associated with the mobile equipment;
  after determining that part or all of the IMSI matches the data set entry within the file associated with the mobile equipment, determine that an elementary file is on the memory device;
  after determining that the elementary file is on the memory device, determine that an access point name is stored in a location identified in the elementary file; and
  after determining that the access point name is stored in the location identified in the elementary file, use the access point name to connect the mobile equipment to a mobile network.

* * * * *